(12) United States Patent　　　(10) Patent No.: US 12,574,210 B2
Breuer　　　　　　　　　　　　　(45) Date of Patent: Mar. 10, 2026

---

(54) ENCRYPTED DATA PROCESSING

(71) Applicant: Hecusys, LLC, Madrid (ES)

(72) Inventor: Peter Breuer, Madrid (ES)

(73) Assignee: HECUSYS LLC, Atlanta, GA (US)

( * ) Notice: Subject to any disclaimer, the term of this patent is extended or adjusted under 35 U.S.C. 154(b) by 554 days.

(21) Appl. No.: 17/237,673

(22) Filed: Apr. 22, 2021

(65) Prior Publication Data

US 2021/0342486 A1　　　Nov. 4, 2021

Related U.S. Application Data

(63) Continuation of application No. 13/775,920, filed on Feb. 25, 2013, now Pat. No. 11,044,076.

(51) Int. Cl.
| | |
|---|---|
| *G06F 21/00* | (2013.01) |
| *G06F 7/57* | (2006.01) |
| *G06F 21/72* | (2013.01) |
| *H04L 9/06* | (2006.01) |

(52) U.S. Cl.
CPC ............... *H04L 9/065* (2013.01); *G06F 7/57* (2013.01); *G06F 21/72* (2013.01); *H04L 2209/122* (2013.01)

(58) Field of Classification Search
USPC ...... 713/192; 380/28, 29, 30, 239, 255, 259, 380/272, 281
See application file for complete search history.

(56) References Cited

U.S. PATENT DOCUMENTS

| | | | | | |
|---|---|---|---|---|---|
| 5,870,477 | A | * | 2/1999 | Sasaki | ................... G06F 21/606 713/165 |
| 6,219,420 | B1 | * | 4/2001 | Hardy | ................. H04L 63/0485 380/37 |
| 6,708,273 | B1 | * | 3/2004 | Ober | ....................... G06F 21/79 713/192 |
| 7,184,550 | B2 | * | 2/2007 | Graunke | ............... H04L 9/0861 380/42 |
| 7,434,069 | B2 | * | 10/2008 | Nessler | ................... G06F 21/72 380/37 |
| 7,620,821 | B1 | * | 11/2009 | Grohoski | .............. G06F 9/3851 380/37 |
| 7,711,955 | B1 | * | 5/2010 | Olson | ................... H04L 9/0637 713/168 |
| 8,055,910 | B2 | * | 11/2011 | Kocher | ............ G11B 20/00086 713/168 |
| 8,477,946 | B2 | * | 7/2013 | Funk | ................... G06F 12/1408 711/170 |
| 8,553,877 | B2 | * | 10/2013 | Scian | ................... H04L 9/0631 380/263 |

(Continued)

OTHER PUBLICATIONS

Craig Gentry, "Fully homomorphic encryption using ideal lattices," Proc. 41st ACM Symposium on Theory of Computing, ACM, pp. 169-178 (2009).*

(Continued)

*Primary Examiner* — Jeremiah L Avery

(57) ABSTRACT

The technology includes processes, computer program products, and systems for encrypted data processing. In a system of the technology, an arithmetic logic unit is arranged to receive encrypted data presented at said inputs, generate encrypted data based upon data presented at said inputs and provide said generated encrypted data to said output. The arithmetic logic unit performs operations on encrypted data and the processor does not require encryption or decryption to be carried out within it.

20 Claims, 9 Drawing Sheets

(56)                References Cited

U.S. PATENT DOCUMENTS

| | | | | | |
|---|---|---|---|---|---|
| 2001/0018736 | A1* | 8/2001 | Hashimoto | ........... | G06F 21/123 |
| | | | | | 713/1 |
| 2002/0037079 | A1* | 3/2002 | Duval | .................... | G06F 7/722 |
| | | | | | 380/37 |
| 2004/0071289 | A1* | 4/2004 | Rose | .................... | H04L 9/0668 |
| | | | | | 380/37 |
| 2006/0132822 | A1* | 6/2006 | Walmsley | ............... | G06F 21/72 |
| | | | | | 358/1.14 |
| 2008/0208560 | A1* | 8/2008 | Johnson | .................. | G06F 21/14 |
| | | | | | 703/22 |
| 2008/0232582 | A1* | 9/2008 | Chevallier-Mames | ...................... | |
| | | | | | G06F 21/52 |
| | | | | | 380/44 |
| 2008/0240421 | A1* | 10/2008 | Gopal | ................. | G06F 9/30007 |
| | | | | | 380/28 |

OTHER PUBLICATIONS

Peter T. Breuer and Jonathan P. Bowen, "A Fully Homomorphic Crypto-Processor Design: Correctness of a Secret Computer," 138, in Jan Jürjens, Benjamin Livshits, and Riccardo Scandariato (eds.), Proc. of Engineering Secure Software and Systems 2013, Lecture Notes in Computer Science, vol. 7781, pp. 123-138 (Feb./Mar. 2013), available at https://link.springer.com/chapter/10.1007/978-3-642-36563-8_9.*

R.L. Rivest, A. Shamir, and L. Adleman, "A method for obtaining digital signatures and public-key cryptosystems," Commc'ns of the ACM, 26(1), 96-99 (Jan. 1983).*

Dorthy E. Denning, "Digital signatures with RSA and other public-key cryptosystems," Commc'ns of the ACM, 27(4), 388-92, 390 (Apr. 1984).*

Lee, Sang Hoon; Choi, Lynn. Accelerating Symmetric and Asymmetric Ciphers with Register File Extension for Multi-word and Long-word Operation. 2008 International Conference on Information Science and Security (ICISS 2008). https://ieeexplore.ieee.org/stamp/stamp.jsp?tp=&arnumber=4438218 (Year: 2008).*

Cui, Xi'ning; Yang, Jingwei. An FPGA based processor for Elliptic Curve Cryptography. 2012 International Conference on Computer Science and Information Processing (CSIP). https://ieeexplore.ieee.org/stamp/stamp.jsp?tp=&arnumber=6308865 (Year: 2012).*

* cited by examiner

ENCRYPTED DATA PROCESSING

The present invention relates to encrypted data processing. In particular, the present invention relates to a processor having an arithmetic logic unit which processes encrypted data to generate encrypted data.

The use of computers has become widespread in almost every aspect of life. With such widespread use of computers, a huge amount of data has been generated some of which relates to sensitive information. With the widespread use of the Internet allowing computers to easily be connected to each other and data to easily be transferred between connected computers, protecting sensitive information has become increasingly important.

The large amount of data now stored by computers provides a rich source of useful information. However it can be difficult to extract useful information from the data given the quantity of data, and extracting the useful information typically requires a large amount of processing power. The need for large amounts of processing power has led to an increase in the use of distributed computing in which processing of data is shared between connected computers so as to make use of the combined processing power of the connected computers. For example, cloud computing has recently been used to process data using a network of remote computers. However, often the data that is to be processed using the distributed computing is sensitive data and it is desirable to transfer and process the data securely.

Data encryption is often used to protect sensitive information by transforming data using an encryption key to make the data unreadable without a corresponding decryption key. In a typical distributed computing arrangement, for example as illustrated in FIG. 1, data stored on a first computer that it is desirable to process using the processing power of other computers is encrypted before it is transferred to the other computers. The other computers are arranged such that they decrypt the data and process the data to generate further data, before encrypting the further data and transferring the encrypted further data to the first computer. Whilst such an arrangement allows data to be transferred between computers securely, the data is vulnerable when it is decrypted at the computers carrying out the distributed processing.

In order to overcome the problem of vulnerability of data when decrypted at a computer, computers for distributed computing have been provided with processors that receive encrypted data and output encrypted data. Such processors have decryption and encryption modules built into the processor such that the only unencrypted data is inside the processor. However such an arrangement may still be vulnerable to attack if operation of the processor is examined by an expert.

Improvements in methods and apparatus for processing encrypted data are therefore desirable.

It is an object of the present invention to provide improvements in encrypted data processing.

According to the invention there is provided a processor comprising a plurality of inputs, an output and an arithmetic logic unit. The arithmetic logic unit is arranged to receive encrypted data presented at said inputs, generate encrypted data based upon data presented at said inputs and provide said generated encrypted data to said output.

That is, the arithmetic logic unit performs operations on encrypted data and the processor does not require any encryption or decryption to be carried out within it. The processor therefore does not store or use the decryption key for the encrypted data as it is simply unnecessary. By providing an arithmetic logic unit that is arranged to receive encrypted data and generate encrypted data based upon the received encrypted data in this way, it is not possible for an observer to determine anything about the data being processed without the decryption key, which may be stored remotely from the processor. Secure data processing is therefore provided.

The arithmetic unit may be provided as a combinatorial logic unit that produces certain outputs when provided with certain inputs, the appropriate matrix of outputs against inputs being physically built into it at construction, or temporarily configured into it under secure conditions. An arithmetic logic unit producing two 16-bit outputs from two 16-bit inputs and a 5-bit control word requires approximately $2^{42}$ bits, or 512 GB of storage space as a matrix array in a read-only memory unit, which size of read-only memory unit is obtainable today as an external device and will be available for fabrication on-chip in the foreseeable future.

Alternatively the arithmetic unit may be provided as a coprocessor unit that stores the decryption key internally and performs decryption and encryption internally in order to produce the appropriate encrypted outputs given encrypted inputs. Such an arithmetic unit can be made physically secure against tampering in the same way as Smart Card processors are made physically secure, by sandwiching the chip circuitry inside protective circuit structures on the same chip that destroy the correct working and any internal data of the processor if physically disturbed.

The arithmetic logic unit may define a plurality of relationships between encrypted data values presented at the inputs and generated data to be provided to the output, the relationships being based upon at least one arithmetic or logical operation to be performed on values represented by the encrypted data. The particular one of the relationships to be used to process the encrypted data values presented at the inputs may be selected based upon an encrypted instruction included in the encrypted data.

The encrypted data may comprise a plurality of bits, and the at least one arithmetic or logical operation may comprise a first operation arranged to operate on a first plurality of the plurality of bits to generate a first output and a second operation arranged to operate on a second plurality of bits to generate a second output, and a third operation arranged to combine the first and second outputs. By performing operations on subsets of bits in this way, the overall size of the arithmetic logic unit can be reduced.

An output of the at least one arithmetic or logical operation may be based upon modification of an output of a corresponding standard arithmetic or logical operation. That is, the operations of the arithmetic logic unit may be non-standard such that an attempt to determine the encryption used to encrypt the data based upon known operations is hindered.

The standard arithmetic or logical operation may be selected from the group consisting of: addition, subtraction, multiplication, division, shift left, logical and, logical or and equivalence.

The processor may further comprise a program counter register, wherein the program counter register stores unencrypted data. The program counter register provides functionality that is generally straightforward to interpret and by storing this data in an unencrypted form it is not possible to use the known functionality of the program counter to attempt to determine the encryption.

The processor may further comprise a fetch arithmetic logic unit arranged to update the program counter register and/or a branch arithmetic logic unit arranged to update the program counter register if a conditional test evaluates to true. The fetch arithmetic logic unit and branch arithmetic logic units may perform operations on unencrypted data.

The plurality of inputs may be a register, and the register may be arranged to store encrypted data based upon the output.

The output may comprise redundant data. In particular, where an output requires only some of the bits available to represent the output value, bits other than those used for the output may be populated with data that is not used. Processing using the output may then be carried out based upon the bits required to represent the output value.

The encrypted data may have an associated type of a plurality of types. In this way, a value represented by the encrypted data may have a plurality of different encrypted representations, each encrypted representation being associated with one of the plurality of types. The encrypted data may be generated based upon at least one type associated with the encrypted data presented at the inputs. For example, a binary operation of the arithmetic logic unit may require the encrypted data to be of different types in order for the operation to be performed correctly. The operation may output a predetermined value when the encrypted data is not of the correct type.

The encrypted data presented at the inputs may include encrypted values and an encrypted instruction. The generated encrypted data may be generated by processing the encrypted values based upon the encrypted instruction.

According to a second aspect of the invention there is provided a computer-implemented method of processing encrypted data encoding information, the method comprising receiving the encrypted data and processing the encrypted data to generate output encrypted data, the processing comprising applying an encrypted operation to the encrypted data, the encrypted operation generating encrypted output corresponding to output generated by applying a corresponding arithmetic or logical operation to the information encoded by the encrypted data and outputting the generated encrypted data.

The method may further comprise receiving an instruction, the instruction indicating an encrypted operation to be applied to the encrypted data.

The method may further comprise storing a matrix. Applying encrypted operations to the encrypted data may comprise determining a part of the matrix indexed by the received instruction and performing matrix multiplication with the part of the matrix and the received encrypted data. That is, the matrix may encode a plurality of relationships between encrypted inputs and encrypted outputs, the relationships corresponding to relationships between input and output values defined by arithmetic and/or logical operations. For example, performing matrix multiplication on encryptions of values x and y with a part of the matrix defining addition results in an encrypted output which when decrypted provides the value x+y.

According to a third aspect of the invention there is provided a computer-implemented method of processing encrypted data, the method comprising receiving at least one encrypted input and receiving an instruction indicating an operation to be performed on the at least one encrypted input. The encrypted input and received instruction are processed to determine if the operation is a restricted operation and an operation other than the operation indicated by the instruction is performed if the operation is determined to be a restricted operation.

Certain operations can be used to determine an encryption. For example, performing division on an encrypted value x with itself, that is performing x/x, will always provide the value "1", and the encrypted value returned by performing such an operation can therefore be used to determine the encryption of 1. By performing an operation other than such an operation that makes the encryption vulnerable the encryption is protected.

According to a fourth aspect of the invention there is provided a computer-implemented method of processing encrypted data comprising receiving a first encrypted input of a first type, receiving a second encrypted input of a second type and receiving an instruction indicating an operation to be performed on the first and second encrypted inputs. The operation is performed on the first and second encrypted inputs based upon the first and second types.

In this way, restrictions may be placed upon operations based upon types associated with encrypted inputs. For example, binary operations may only be permitted to perform operations on two data items if the two data items have different types, or may output a particular input not in accordance with the received instruction where two data items have the same type.

As set out above with reference to the third embodiment of the invention, certain operations may be used to determine particular encrypted values. Such operations generally rely on processing unknown data values in such a way that the same result will be returned, irrespective of the data values themselves. By performing operations based upon types associated with data values, such operations need not be restricted, provided that any type restriction is satisfied.

In particular, each data value may have two or more associated encrypted values, each encrypted value being of a different type. Ensuring that operations are performed on data values of different types therefore effectively ensures that no operation such as x/x where x is the same encrypted data value is performed, whilst not restricting the performance of operations on encrypted values corresponding to operations such as division of an unencrypted value by itself. This is because the encrypted operation will be x/x' where both x and x' correspond to the same unencrypted value but are of different types.

Embodiments of the present invention will now be described, by way of example only, with reference to the accompanying drawings, in which.

Figure 1:
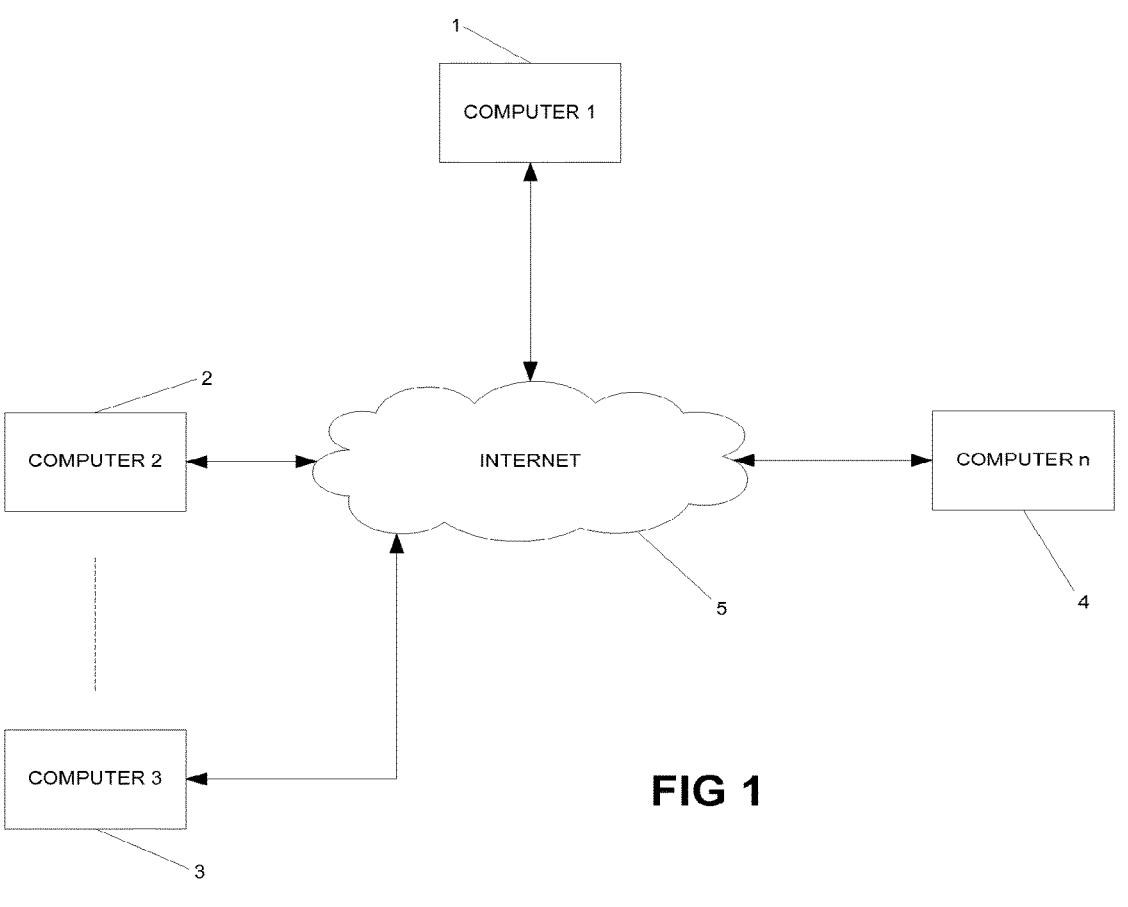
FIG. 1 is a schematic illustration of a network of computers in which the invention can be used.

Referring to FIG. 1, a plurality of computers 1, 2, 3, 4 are each arranged to communicate with the Internet 5 and can communicate with other ones of computers 1, 2, 3, 4 as well as further computers via the Internet 5. Communication between computers using the Internet 5 allows data stored on each of the computers 1, 2, 3, 4 to be accessed by other ones of the computers 1, 2, 3, 4 as well as by further computers. Communication between computers allows processing to be distributed between the computers. For example where a large amount of processing is required to process data stored on the computer 1, the processing may be shared amongst the computer 2, 3, 4. However the data that is to be processed may be sensitive and it is therefore desirable for the data stored on the computer 1 to be processed using the computers 2, 3, 4 securely such that a malicious user cannot access any of the data during processing by one of the computers 2, 3, 4. As such, the computer 1 may provide the data to the computers 2, 3, 4 in an encrypted form for processing.

Figure 1A:
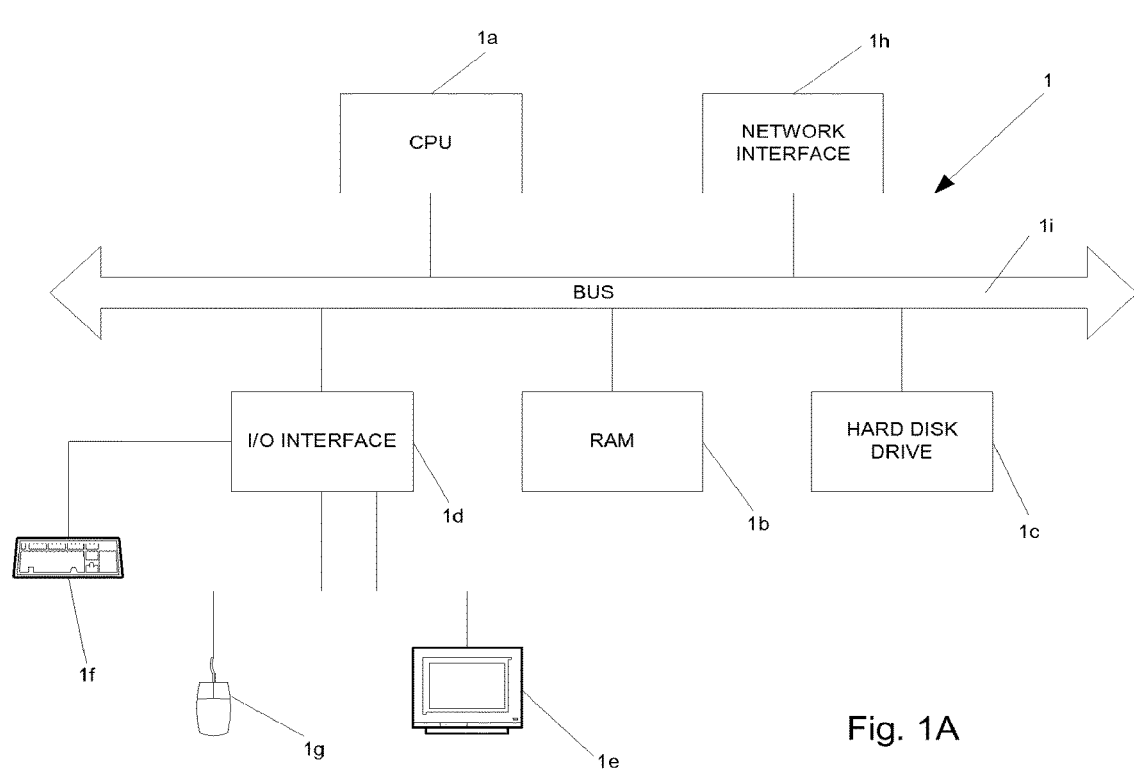
FIG. 1A is a schematic illustration of a computer of FIG. 1.

FIG. 1A shows a computer 1 of the system of FIG. 1 in further detail. It will be appreciated that each of the computers 1, 2, 3, 4 has the general architecture shown in FIG. 1A. It can be seen that the computer 1 comprises a CPU 1a which is configured to read and execute instructions stored in a volatile memory 1b which takes the form of a random access memory. The volatile memory 1b stores instructions for execution by the CPU 1a and data used by those instructions. For example, in use, the software used to control the processing of data may be stored in the volatile memory 1b.

The computer 1 further comprises non-volatile storage in the form of a hard disc drive 1c. Data such as the data to be processed may be stored on the hard disc drive 1c. The computer 1 further comprises an I/O interface 1d to which are connected peripheral devices used in connection with the computer 1. The computer 1 has a display 1e configured so as to display output from the server. Input devices are also connected to the I/O interface 1d. Such input devices include a keyboard 1f, and a mouse 1g which allow user interaction with the computer. A network interface 1h allows the computer 1 to be connected to an appropriate computer network so as to receive and transmit data from and to other computing devices such as the computers 2, 3, 4 of FIG. 1. The CPU 1a, volatile memory 1b, hard disc drive 1c, I/O interface 1d, and network interface 1h, are connected together by a bus 1i. Components of the computer 5 may be encrypted, as described below.

Figure 2A:
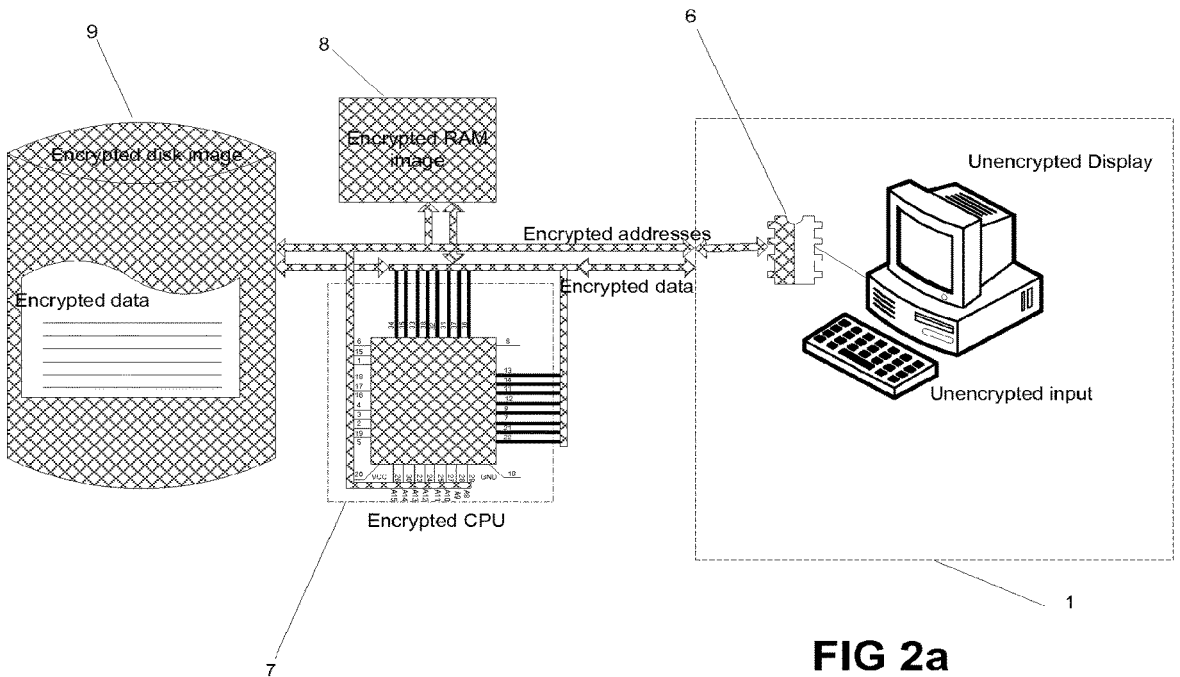
FIG. 2a is a schematic illustration of distributed computing according to an embodiment of the invention.

FIG. 2a shows the interaction between the computer 1 and other computers. Data stored on the computer 1 is unencrypted and it is desirable to allow the unencrypted data stored on the computer 1 to be processed using at least one of the other computers 2, 3, 4. As such, data that is transmitted from the computer 1 to the computers 2, 3, 4 is encrypted before transmission using encryption/decryption circuitry 6.

Each of the computers 2, 3, 4 that receives the encrypted data from the computer 1 is provided with a processor 7 arranged to receive and process encrypted data and memory 8, 9 arranged to receive and store encrypted data and to provide encrypted data to the processor 7 for processing. The processor 7 is arranged to perform operations on the received encrypted data and to provide encrypted output data. Conversely to prior art processors, in which encrypted data is decrypted prior to performing operations on the data in the processor and the output data resulting from the processing by the processor is encrypted, the processor 7 performs no decryption or encryption but instead performs operations on encrypted data. In this way, the processor 7 is secure in the sense that it is not possible to analyse the processor 7 to determine the encryption and/or decryption used by the encryption/decryption chips 6.

Figure 2B:
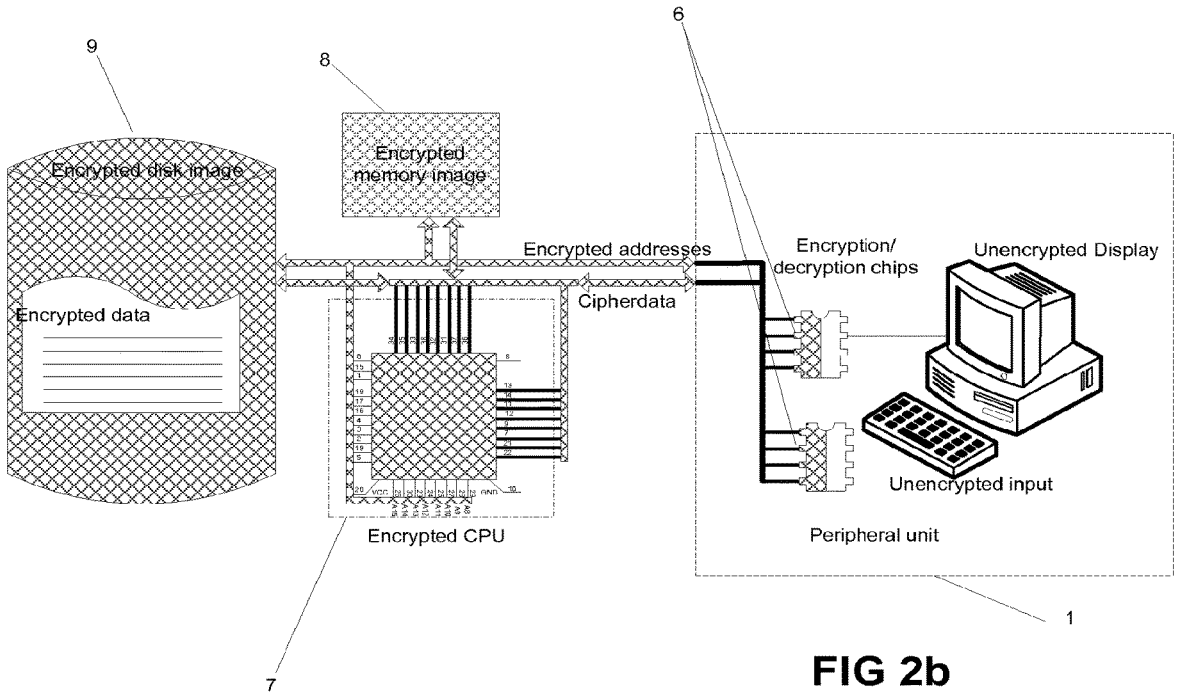
FIG. 2b is a schematic illustration of computing with a thin client according to an embodiment of the invention.

FIG. 2b shows a similar interaction between a thin client, in which most data storage and processing is carried out by a remote computer, and other computers. In the arrangement shown in FIG. 2b data is decrypted by encryption/decryption chips 6 for display to a user and data input by the user is encrypted before being transmitted to the remote computer.

Figure 3:
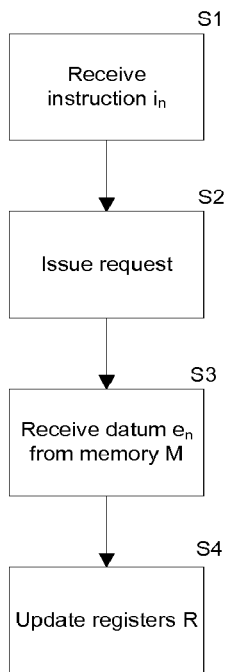
FIG. 3 is a flowchart showing operation of a Von Neumann machine to process an instruction.

Operation of the processor 7 can be described in terms of a Von Neumann machine architecture and as such operation of a Von Neumann machine to process an instruction and update registers will now be described with reference to FIG. 3.

At step S1 the processor receives a machine code instruction $i_n$ from memory. The instruction $i_n$ is fetched from machine code memory P. The instruction $i_n$ is fetched from a location $p_n$ in P indicated by a value of a program counter register. At step S2 the processor 7 issues a request to read-write memory M based upon the instruction $i_n$. The request may be a read request of the form $a_n$? requesting data $e_n$ from a memory location $a_n$, a write request of the form $a_n!d_n$ requesting that data $d_n$ is written to a memory location $a_n$ or a jump request of the form $\uparrow j_n$ requesting the value of the program counter $p_n$ is changed to $p_{n+1}=j_n$. Alternatively no request may be issued. In each case other than where a jump request is made the program counter is incremented.

At step S3 the processor receives a datum $e_n$ which may be void if the read request of step S2 was other than a read request and at step S4 the state of the registers R is updated in response to the instruction $i_n$ based upon the datum $e_n$.

The Von Neumann machine cycle described above with reference to FIG. 3 can be described formally by equations (1) to (4) below. The instruction to the memory unit or program counter emitted at every cycle of the processor can be described formally in the form shown in equation (1):

$$s_n \in \{a_n!d_n, a_n?, \uparrow j_n, \varnothing\}$$

$$r_n \in \{e_n, \varnothing\} \tag{1}$$

and the input received from the read-write memory M correspondingly is as shown in equation (2):

$$r_n = \begin{cases} \varnothing & s_n a_n!d_n \\ e_n & s_n = a_n? \\ \varnothing & s_n = \uparrow j_n \\ \varnothing & s_n = \varnothing \end{cases} \tag{2}$$

where:

Ø indicates void input or output; and $e_n$ is the content of memory at address $a_n$ received in response to memory request $a_n$?.

Then a Von Neumann computer can be described formally by equations (3) and (4):

$$\langle R_{n+1}, s_n \rangle = \langle R_n, i_n, r_n \rangle \mu \tag{3}$$

$$r_n = \begin{cases} a_n M_n & s_n = a_n? \\ \varnothing & \text{otherwise} \end{cases}$$

$$aM_{n+1} = \begin{cases} d_n & a = a_n \text{ and } s_n = a_n!d_n \\ aM_n & \text{otherwise} \end{cases}$$

$$i_n = p_n P \tag{4}$$

$$P_{n+1} = \begin{cases} j_n & s_n = \uparrow j_n \\ P_n + \text{length } (i_n) & \text{otherwise} \end{cases}$$

where $R_n$, $R_{n+1}$ is the register slate respectively before and after the processor cycle;

$M_n$, $M_{n+1}$ is the read-write memory state respectively before and after the processor cycle;

$i_n$ is the machine code instruction found at the program counter address $p_n$ in the read-only memory P; and $\mu$ is the transition function for the system.

Figure 4:
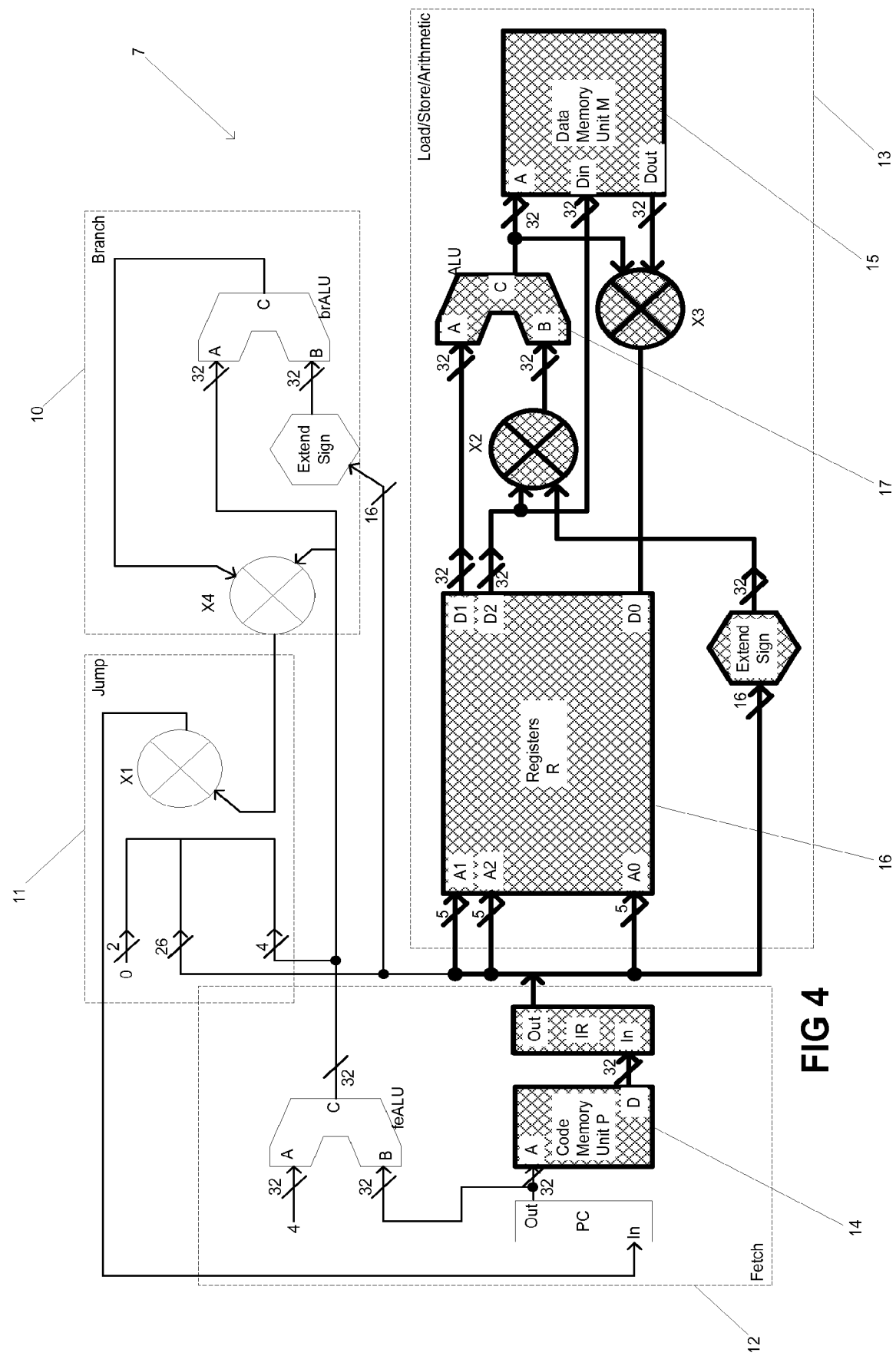
FIG. 4 is a schematic illustration of a processor according to an embodiment of the invention.

FIG. 4 shows the processor 7 of FIG. 2 in more detail. The processor architecture shown in FIG. 4 is a MIPS processor architecture, although it will be appreciated that other processor architectures are suitable for carrying out the invention. Components of the processor 7 can be classified into Branch components 10, Jump components 11, Fetch components 12 and Load/Store/Arithmetic components 13. FIG. 4 shows encrypted components and pathways of the processor 7 in bold with components additionally shown with cross hatching.

It can be seen that encrypted parts of the processor 7 generally relate to the Load/Store/Arithmetic components and that Branch components 10 and Jump components 11 are unencrypted. Branch components 10 and Jump components 11 together with some of the Fetch components are unencrypted because they relate to the program counter and do not process any secure data. That is, the program counter does not contain any sensitive data and so encryption is not necessary. Functionality of components is described in further detail below. Whilst it is possible to encrypt the Branch components 10 and Jump components 11, doing so is generally undesirable as the functionality of these components is well known and common to most processors and can therefore provide vulnerability of the processor 7 to attack to determine the encryption used, in a similar way to other expected processor functionality as described below.

FIG. 4 shows a machine code memory 14 corresponding to P of the Von Neumann machine, memory 15 corresponding to M of the Von Neumann machine, registers 16 corresponding to R of the Von Neumann machine, and arithmetic logic unit (ALU) 17, corresponding to the transition function $\mu$ of the Von Neumann machine, together with fetch and branch ALUs marked feALU and brALU respectively and other standard processor components including multiplexers X1 to X4 and sign extension units indicated "Extend Sign" which convert 16 bit data into 32 bit data by propagating sign bit of the 16 bit number to create a 32 bit number.

As can be seen from equation (4), the transition function $\mu$ acts to change the state of the registers R based upon an instruction. The transition function $\mu$ can be viewed as a matrix which operates to generate output based upon particular inputs in a predetermined way. Alternatively the transition function $\mu$ may be implemented as a secure co-processor that generates output based upon inputs, for example a processor that is certified as being secure by a manufacturer. As such, the operation of $\mu$ can be specified such that it operates on encrypted input data to produce encrypted output data such that decrypting the encrypted output data provides equivalent data to carrying out a corresponding operation on unencrypted data using an unencrypted transition function. In this way, the processor does not carry out any encryption or decryption and as such is secure against analysis to determine the encryption applied to the data being processed.

As indicated above, the transition function $\mu$ operates on inputs to generate an output in accordance with an instruction. In general terms, all functionality carried out by a computer is based upon a set of elementary functions that together form an instruction set that a processor such as the processor 7 can perform, and the instruction determines which elementary function the processor is to carry out. The instruction may, for example, be used by a control line of the transition function to select a sub-matrix of $\mu$ that provides functionality corresponding to the instruction.

Elementary functions can be viewed as building blocks from which other functionality can be built. For example, it is well known that integer arithmetic, including addition, subtraction, multiplication and division, can be performed using only addition and subtraction and as such a processor arranged to carry out integer arithmetic can be implemented using an instruction set of addition and subtraction only. An example of a complete instruction set based upon the MIPS processor instruction set is discussed below.

A processor can carry out complex functions using a relatively small set of elementary functions and the transition function $\mu$ need only be arranged such that a desired elementary function can be selected and carried out. However, even with a relatively small set of elementary functions, the size of the matrix corresponding to the transition function $\mu$ is generally very large and it is therefore desirable to reduce the size of $\mu$. A further decomposition can be carried out for many operations on the inputs to reduce the inputs into bits to further reduce the complexity of operations and correspondingly the size of $\mu$. An example of decomposition of inputs is provided below.

As indicated above, FIG. 4 shows a MIPS processor architecture, which is an example of an architecture suitable for carrying out the invention. As described in further detail below, the MIPS architecture interprets three classes of 32 bit length machine code instruction. As such, the MIPS architecture is relatively simple and is therefore herein used to illustrate the invention. However it will be appreciated that the invention can be applied to processor architectures other than the MIPS architecture.

The MIPS processor architecture has 32 general purpose registers 16, one of which is read-only and stores the value 0 for copying and comparison, and one of which is set by a jump-and-link instruction to the current value of the program counter before it is changed by a jump, which is useful in implementing subroutine calls and is referred to as the return address register below. All other ones of the general purpose registers can be designated as a source or target by any suitable machine code instruction. An instruction register indicated "IR" in FIG. 4 stores a copy of the current instruction being executed and a program counter register indicated "PC" in FIG. 4 stores the address of the current instruction. Two further registers referred to below as "lo" and "hi" are not shown in FIG. 4.

Figure 5:
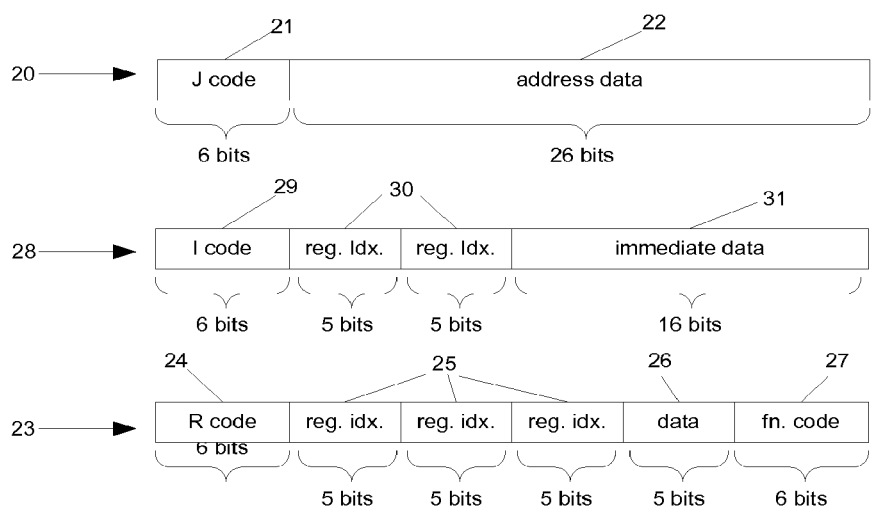
FIG. 5 is a schematic illustration of example MIPS machine code instructions.

As indicated above, the MIPS architecture interprets three classes of 32 bit length machine code instruction, the layout and fields of which are each shown in FIG. 5. Instructions of a first class 20 are referred to as "J" and relate to jump instructions in which the program counter is changed to a value other than by standard incrementation. J instructions comprise 6 J code bits 21 that identify an instruction and 26 address data bits 22 that identify an address.

Instructions of a second class 23 are referred to as "R" and relate to register arithmetic in which arithmetic is carried out on values stored in registers. R instructions comprise 6 R code bits 24 that identify an instruction, three 5 bit register indices 25 that indicate register locations on which register arithmetic is to be performed, 5 bits of data 26 possibly used in the register arithmetic and 6 bits of function code 27 indicating the function to be carried out.

Instructions of a third class 28 are referred to as "I" and relate to branch, load/store and immediate arithmetic in which operations are carried out on values stored in registers. I instructions comprise 6 I code bits 29 that identify an instruction, two 5 bit register indices 30 that identify registers and 16 bits of immediate data 31. It can be noted that not all MIPS instructions use all code bits and where a MIPS instruction does not use code bits these bits are set to zero values and/or ignored during processing of the instruction.

As indicated above, the processor of FIG. 4 is arranged to carry out the instruction currently stored in the instruction register and is generally divided into Branch components 10, Jump components 11, Fetch components 12 and Load/Store/ Arithmetic components 13.

The Fetch components 12 operate to increment the program counter register by 4 (corresponding to the number of bytes in an instruction such that the program counter indicates the next instruction after incrementation) and to copy the previously addressed instruction into the instruction register.

The Jump components 11 operate to modify the default fetch cycle in which the program counter register is incremented by 4 based upon a jump instruction J in the instruction register by modifying the 26 address data bits 22 to form a 32 bit output which replaces the data stored in the program counter register.

The Branch components 10 also operate to modify the default fetch cycle when a branch instruction I is executed and when a conditional test of the branch instruction based upon the registry indexes 30 evaluates as true. Where the conditional test evaluates as true the immediate data 31 is added to the program counter using the brALU of FIG. 4.

The Load/Store/Arithmetic components 13 operate to update a memory location of the general purpose registers 16 when an Arithmetic instruction R or a Load/Store instruction I is executed. The registers 16 are updated based upon data generated by the ALU 13 and based upon data received from the registers in the case of an R instruction as indicated by registry indexes 26 or based upon data stored within the instruction in the case of an I instruction. The memory location of the general purpose registers may either be indicated in the R instruction by one of the registry indexes 26 or may be calculated by the components 13 for an I instruction.

Formally, a MIPS instruction $i_n$ drives the state transformation of the registers from $R_n$ to $R_{n+1}$ based upon the transition function $\mu$ as shown in equation (3). Additionally, input $r_n$ may be read based upon the instruction $i_n$ and output $s_n$ may be written based upon the instruction $i_n$.

Sign extension units provide additional functionality $\Xi$ to map a number x stored as 16 bits to 32 bits, as defined in equation (5).

$$x\Xi = \begin{cases} x & 0 \le x < 2^{15} \\ x - 2^{16} & 2^{15} \le x < 2^{16} \end{cases} \tag{5}$$

Each ALU of the processor is described formally as a function of the form shown in equation (6):

$$\langle a,b \rangle \, ALU_\iota = \langle c,z \rangle \tag{6}$$

where a, b, c, z are 32 bit integers; and
$\iota$ is a MIPS machine code instruction.

For example, in the case of addition the ALU is typically designed such that equation (7) is satisfied:

$$\langle a,b \rangle \, ALU_{add} = \langle (a+b) \bmod 2^{32}, \lfloor (a+b)/2^{32} \rfloor \rangle \tag{7}$$

Table 1 shows the standard set of MIPS instructions in which instructions are divided into 10 groups according to instruction type.

TABLE 1

| instruction | mnemonic | Format |
|---|---|---|
| jump | J, JAL | J |
| branch | BEQ, BNE, BLE, BGT, BLTZ, BGEZ | I(b) |
| register shift | SLLV, SRLV | R |
| register move | MFHI, MFLO | |
| registered arithmetic | ADD, ADDU, SUB, SUBU AND, OR, XOR, NOR, SLT, SLTU | |
| double register arithmetic | MULT, MULTU, DIV, DIVU | R(2) |
| register misc. | SYSCALL, BREAK | R(x) |
| jump register | JR, JALR | R(j) |
| immed. shift | SLL, SRL, SRA | R(s) |
| immediate arithmetic | ADDI, ADDIU, SLTI, SLTIU, ANDI, ORI, XORI, LUI | I |
| immediate double arithmetic | MULTI, MULTIU, DIVI, DIVIU | I(2) |
| load/store | LW, LB, SW, SB | I(m) |

It can be seen in Table 1 that the instruction classes R, J and I described above with reference to FIG. 5 can be further divided into sub-types based upon the instruction format. Equations (8) to (20) show the change of state of registers R and input r read from and outputs s written to the memory M for a characteristic instruction i from each instruction class sub-type. In the following equations a projection $\pi_c$ is used to select the first output of the ALU and the projection $\pi_z$ is used to select the second output of the ALU.

$$add\ \rho_1, \rho_2, \rho_3: \tag{8}$$
$$\rho R_{n+1} = \begin{cases} \langle \rho_2 R_n, \rho_3 R_n \rangle ALU_{add} \pi_c & 0 \ne \rho = \rho_1 \\ \rho R_n & \text{otherwise} \end{cases}$$
$$r_n = s_n = \varnothing$$

$$mult\rho_1, \rho_2: \tag{9}$$
$$\rho R_{n+1} = \begin{cases} \langle \rho_1 R_n, \rho_2 R_n \rangle ALU_{mult} \pi_c & \rho = lo \\ \langle \rho_1 R_n, \rho_2 R_n \rangle ALU_{mult} \pi_z & \rho = hi \\ \rho R_n & \text{otherwise} \end{cases}$$
$$r_n = s_n = \varnothing$$

$$syscall: \tag{10}$$
$$\rho R_{n+1} = \begin{cases} \rho R_n & \theta = 0 \\ P_n + length\ (i_n) & \rho = epc \\ cause\_sys & \rho = cause \\ 0R_n & \rho = status \\ causeR_n & \rho = estatus \\ \rho R_n & \text{otherwise} \end{cases}$$

$$mflo\rho_1: \tag{11}$$
$$\rho R_{n+1} = \begin{cases} loR_n & 0 \ne \rho = \rho_1 \\ \rho R_n & \text{otherwise} \end{cases}$$
$$r_n = s_n = \varnothing$$

$$addi\rho_1, \rho_2, k: \tag{12}$$
$$\rho R_{n+1} = \begin{cases} \langle \rho_2 R_n, k\Xi \rangle ALU_{add} \pi_c & 0 \ne \rho = \rho_1 \\ \rho R_n & \text{otherwise} \end{cases}$$
$$r_n = s_n = \varnothing$$

-continued $multi \rho_1, k :$ (13)

$$\rho R_{n+1} = \begin{cases} \langle \rho_1 R_n, k \Xi \rangle ALU_{mult} \pi_c & \rho = lo \\ \langle \rho_1 R_n, k \Xi \rangle ALU_{mult} \pi_z & \rho = \text{hi} \\ \rho R_n & \text{otherwise} \end{cases}$$

$r_n = s_n = \varnothing$ $beq \rho_1, \rho_2, k :$ (14)

$R_{n+1} = R_n$ $$s_n = \begin{cases} \uparrow \theta & \langle \rho_1 R_n, \rho_2 R_n \rangle ALU_{eq} \pi_z \neq 0 \\ \varnothing & \text{otherwise} \end{cases}$$

where $\theta = p_n + length\ (i_n) + k$ $r_n = \varnothing$ $jk :$ (15)

$R_{n+1} = R_n$ $s_n = \uparrow \theta$ where $\theta = 2^{28} \lfloor p_n / 2^{28} \rfloor + k$ $r_n = \varnothing$ $jalk :$ (16)

$$\rho R_{n+1} = \begin{cases} p_n + length\ (i_n) & \rho = ra \\ \rho R_n & \text{otherwise} \end{cases}$$

$s_n = \uparrow \theta$ where $\theta = 2^{28} \lfloor p_n / 2^{28} \rfloor + k$ $r_n = \varnothing$ $jr \rho_1 :$ (17)

$R_{n+1} = R_n$ $s_n = \uparrow \rho_1 R_n$ $r_n = \varnothing$ $jalr \rho_1 :$ (18)

$$\rho R_{n+1} = \begin{cases} p_n + length\ (i_n) & \rho = ra \\ \rho R_n & \text{otherwise} \end{cases}$$

$s_n = \uparrow \rho_1 R_n$ $r_n = \varnothing$ $lw \rho_1, k(\rho_2) :$ (19)

$$\rho R_{n+1} = \begin{cases} e_n & 0 \neq \rho = \rho_1 \\ \rho R_n & \text{otherwise} \end{cases}$$

where $a = \langle \rho_2, k \Xi \rangle ALU_{add} \pi_c$ $s_n = a?$ $r_n = e_n = aM$ $sw \rho_1, k(\rho_2) :$ (20)

$s_n = a!(\rho_1, R_n)$ where $a = \langle \rho_2, k \Xi \rangle ALU_{add} \pi_c$ $r_n = \varnothing$ In general terms, the MIPS processor is modified for encryption by modifying the paths and components highlighted in bold and with additional cross hatching for components. Encrypted memory and register components shown in FIG. 4 require no modification since they simply store data, which is provided encrypted to the processor. Additionally, multiplexers X2, X3 require no modification since they simply combine encrypted data into a single encrypted datum. As such, only the ALU 17 and the corresponding sign extension component require modification to operate on encrypted data, with the aim being to generate a transition function µ' that satisfies the relationship shown in equation (21):

$$D\mu = \mu'D$$ (21)

where D is a decrypting function that produces unencrypted output given encrypted input.

The modified functionality µ' is achieved by replacing the ALU and the sign extension unit of FIG. 4 by modified units with functionalities ALU' and Ξ' given by (22):

$$D\Xi = \Xi'D$$

$$(D \times D)ALU_{i0} \pi_z (=0) = ALU'_{i0} \pi_z (=0)$$

$$(D \times D)ALU_{i1} \pi_c = ALU'_{i1} \pi_c D$$

$$(D \times D)ALU_{i2} = ALU'_{i2'}(D \times D)$$ (22)

where:

i0 is the function code for one of the ALU comparison relations and i0' is its encryption;

i1 is the function code for one of the add, shift, bitwise and, bitwise or, and other similar operations ALU operations and i1' is its encryption;

i2 is the function code for one of the mult, div ALU operations and i2' is its encryption.

Equation (21) states that D is a homomorphism on the functionality of the transition function such that applying µ' to encrypted data and decrypting the output provides an equivalent output to applying the transition function µ to unencrypted data. Equation (22) is similarly a statement of homomorphism of the functionality of the sign extension and ALU components.

Any modified functionalities ALU' and Ξ' satisfying (22) will provide encrypted data processing in accordance with the invention. The functionalities ALU' and Ξ' can be constructed based upon encryption ε and decryption D according to (23):

$$D\Xi\varepsilon = \Xi'$$

$$(D \times D)ALU_{i0} \pi_z (=0) = ALU'_{i0} \pi_z (=0)$$

$$(D \times D)ALU_{i1} \pi_c \varepsilon = ALU'_{i1} \pi_c$$

$$(D \times D)ALU_{i2}(\varepsilon \times \varepsilon) = ALU'_{i2'}$$ (23)

Where the ALU and sign extension units of FIG. 4 have functionality satisfying (22) the processor performs encrypted operations satisfying equations (24) to (35) below.

$$i'_n = add'\ \rho_1, \rho_2, \rho_3$$ (24)

$$\rho R'_{n+1} = \begin{cases} \langle \rho_2 R'_n, \rho_3 R'_n \rangle ALU'_{add} \pi_c & 0 \neq \rho = \rho_1 \\ \rho R'_n & \text{otherwise} \end{cases}$$

$r'_n = s'_n = \varnothing$ $$i'_n = mult'\ \rho_1, \rho_2$$ (25)

$$\rho R'_{n+1} = \begin{cases} \langle \rho_1 R'_n, \rho_2 R'_n \rangle ALU'_{mult'} \pi_c & \rho = lo \\ \langle \rho_1 R'_n, \rho_2 R'_n \rangle ALU'_{mult'} \pi_z & \rho = \text{hi} \\ \rho R'_n & \text{otherwise} \end{cases}$$

$r'_n = s'_n = \varnothing$ $$i'_n = mflo'\ \rho_1$$ (26)

$$\rho R'_{n+1} = \begin{cases} loR'_n & 0 \neq \rho = \rho_1 \\ \rho R'_n & \text{otherwise} \end{cases}$$

$r'_n = s'_n = \varnothing$ $$i'_n = addi'\ \rho_1, \rho_2, k'$$ (27)

$$\rho R'_{n+1} = \begin{cases} \langle \rho_2 R'_n, k' \Xi' \rangle ALU'_{add'} \pi_c & 0 \neq \rho = \rho_1 \\ \rho R'_n & \text{otherwise} \end{cases}$$

$r'_n = s'_n = \varnothing$

-continued $$i'_n = multi' \rho_1, k'$$ (28)

$$\rho R'_{n+1} = \begin{cases} \langle \rho_1 R'_n, k\Xi\rangle ALU'_{mult'} \pi_c & \rho = lo \\ \langle \rho_1 R'_n, k\Xi\rangle ALU'_{mult'} \pi_z & \rho = hi \\ \rho R'_n & \text{otherwise} \end{cases}$$

$$r'_n = s'_n = \varnothing$$

$$i'_n = beq' \rho_1, \rho_2, k$$ (29)

$$R'_{n+1} = R'_n$$

$$s'_n = \begin{cases} \uparrow \theta & \langle \rho_1 R'_n, \rho_2 R'_n\rangle ALU'_{eq'} \pi_z \neq 0 \\ \varnothing & \text{otherwise} \end{cases}$$

where $\theta = p'_n + length\,(i'_n) + k$ $$r'_n = \varnothing$$

$$i'_n = j'k$$ (30)

$$R'_{n+1} = R'_n$$

$$s'_n = \uparrow \theta \text{ where } \theta = 2^{28}\lfloor p'_n / 2^{28} \rfloor + k$$

$$r'_n = \varnothing$$

$$i'_n = jal'k:$$ (31)

$$\rho R'_{n+1} = \begin{cases} p'_n + length\,(i'_n) & \rho = ra \\ \rho R'_n & \text{otherwise} \end{cases}$$

$$s'_n = \uparrow \theta \text{ where } \theta = 2^{28}\lfloor p'_n / 2^{28} \rfloor + k$$

$$r'_n = \varnothing$$

$$i'_n = jr' \rho_1:$$ (32)

$$R'_{n+1} = R'_n$$

$$s'_n = \uparrow (\rho_1 R'_n)$$

$$r'_n = \varnothing$$

$$i'_n = jalr' \rho_1$$ (33)

$$\rho R'_{n+1} = \begin{cases} p'_n + length\,(i'_n) & \rho = ra \\ \rho R'_n & \text{otherwise} \end{cases}$$

$$s'_n = \uparrow (\rho_1 R'_n)$$

$$r'_n = \varnothing$$

$$i'_n = lw' \rho_1, k'(\rho_2)$$ (34)

$$\rho R'_{n+1} = \begin{cases} e'_n & 0 \neq \rho = \rho_1 \\ \rho R'_n & \text{otherwise} \end{cases}$$

where $a = \langle \rho_2 R'_n, k'\Xi'\rangle ALU'_{add'} \pi_c$ $$s'_n = a'\,?$$

$$r'_n = e'_n = a' M'_n$$

$$i'_n = sw' \rho_1, k'(\rho_2)$$ (35)

$$R'_{n+1} = R'_n$$

$$s'_n = a'\,!(\rho_1, R'_n)$$

where $a = \langle \rho_2 R'_n, k'\Xi'\rangle ALU'_{add'} \pi_c$ $$r'_n = \varnothing$$

According to equations (24) to (35) the encrypted processor performs operations that correspond to operations of the corresponding unencrypted processor, but operate on encrypted data stored in register and memory locations that correspond to the unencrypted data operated upon by the corresponding unencrypted processor. That is, an encrypted processor operating in the manner described above on encrypted data stored in register and memory locations corresponds to an unencrypted processor performing corresponding operations on corresponding unencrypted data as formally described by (36):

$$p_n = p'_n$$ (36)

$$R_n = R'_n D$$

$$DM_n = M'_n D$$

$$r_n = \begin{cases} r'_n D & r'_n = \varnothing \\ \varnothing & \text{otherwise} \end{cases}$$

$$s_n = \begin{cases} (a'_n D)!(d'_n D) & s'_n = a'_n\,!d'_n \\ (a'_n D)? & s'_n = a'_n\,? \\ \uparrow j'_n & s'_n = \uparrow j'_n \\ \varnothing & s'_n = \varnothing \end{cases}$$

Figure 6:
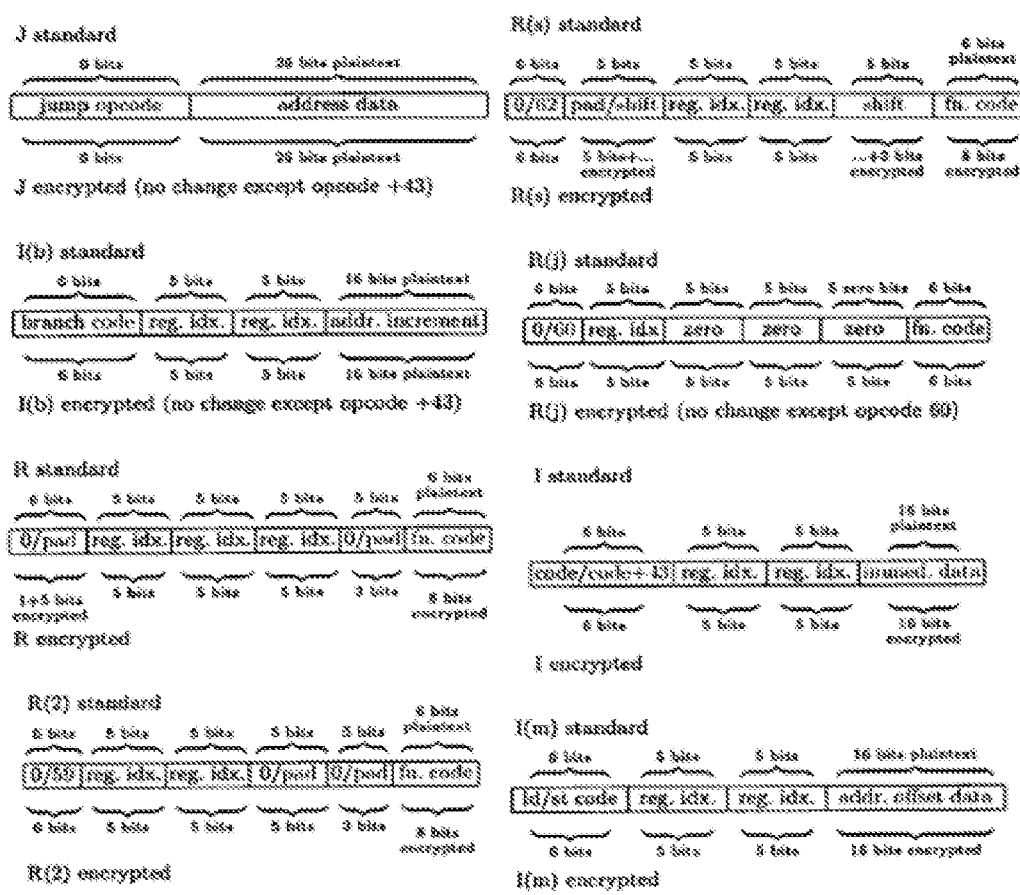
FIG. 6 is a schematic illustration of a design for an encrypted MIPS instruction set.

A design for an encrypted MIPS instruction set that satisfies the relationships of equations (21) and (22) is shown in FIG. 6 together with Table 2. The encryption used for the design shown in FIG. 6 and Table 2 is "in place" such that encrypted instructions require the same number of bits as the instructions that they replace, however encrypted instructions of arbitrary length can be used by using pointers as placeholders and by modifying the fetch functionality accordingly. It can be noted that in some instructions the opcode is modified such that identification of the operations is prevented.

TABLE 2

| format | instruction | encrypted fields | encrypted bits |
|---|---|---|---|
| J | j, jal | — | — |
| I | addi, andi, ori, xori, slti, addiu, etc. | immediate data | 0-15 |
| I(2) | multi, divi, etc. | immediate data | 0-15 |
| I(b) | beq, bne, ble, bgt, etc. | — | — |
| I(m) | lw, lbu, lb, sw, sb | address displacement | 0-15 |
| R | add, addu, sub, subu, etc. | padding, function code | 26-30; 8-10, 0-7 |
| R(2) | mult, multu, div, divu | padding, function code | 11-15; 8-10, 0-7 |
| R(s) | sll, srl, sra | data, function code | 21-2.5; 8-10, 0-7 |
| R(j) | jr, jalr | — | — |

Encrypted machine code suitable for use with an encrypted processor may be generated by first compiling code in the normal way to generate an unencrypted object code file and subsequently further compiling the unencrypted object code file such that instruction fields shown in Table 2 as requiring encryption are encrypted and instruction codes are encrypted. Optionally program instructions may be moved to a different memory location and pointers left behind and instructions may be replaced with equivalent functions in order to further protect against attack, as described above and exemplified by addition being replaced by faux-addition.

The encrypted machine code uses encrypted memory addresses such that an encrypted datum d' is returned from memory when an encrypted address a' is provided to the encrypted memory. For read-write memory locations used by a program during execution of that program, no decryption of addresses or data is required by the memory since d' is simply stored at address a' in memory, having been provided by the program, and then retrieved by the same program from the same address a' such that the address is simply a label used by the program.

The processor may include a memory manager for remapping addresses so that they occupy contiguous areas in the memory in order to avoid issues with caching of data (that is, temporary storage of data likely to be used again). The memory manager may use a "first come, first served" strategy to remap addresses four bytes at a time such that encrypted addresses are physically remapped in memory to match the order in which they are issued. In this way, the memory manager can operate on encrypted addresses and data to effect caching.

For read only data memory locations data is written to memory before execution of the program such that the data is computed by the compiler or a program loader. In order to ensure that the memory unit acts in the desired way, a two phase process may be used in which in a first phase at compile time read only data $d_i$ is replaced by encoded data $d'_i$ in the object file and address regions are defined as read only sections containing the data word $d'_i$. In a second phase during program load, words $d'_i$ in the read only sections of the object file are loaded into memory and mapped at logical addresses indicated by the address regions defined in the first phase. In this way, the program is provided with encrypted data at addresses known to the program without knowing the encryption or decryption for the data.

In some embodiments some of the operations may be omitted to reduce the size of the encrypted ALU. For example, as indicated above it is well known that integer arithmetic, including addition, subtraction, multiplication and division, can be performed using only addition and subtraction and as such a processor arranged to carry out integer arithmetic can be implemented using an instruction set of addition and subtraction only.

Similarly, in principle a fully functional encrypted ALU can be implemented using only addition, arithmetic negation and less than. For example, multiplication can be implemented by repeated addition, shift can be constructed through multiplication and division by powers of two and division can be implemented by multiplication, comparison and arithmetic negation in combination with addition (to perform subtraction). Other function reduction schemes are also possible.

Where operations are omitted to reduce the size of the ALU an omitted machine code instruction may cause an exception that implements the omitted functionality as an algorithm using functionality included in the encrypted ALU.

Figure 7:
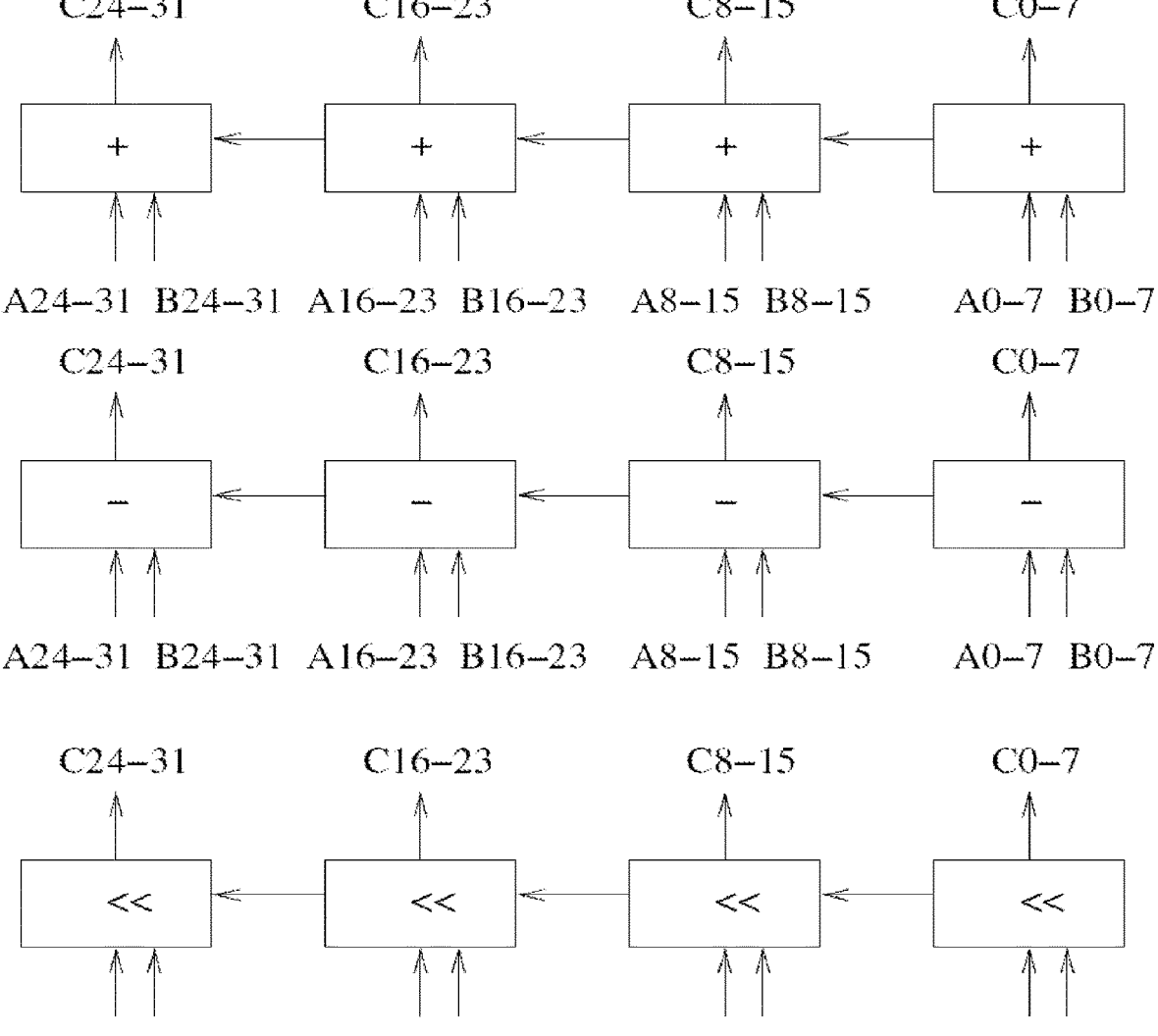
FIGS. 7, 8 and 9 are each a schematic illustration of reduction of integer arithmetic operations on 32-bit integers to operations on 8-bit integers.

As indicated above, a decomposition can be carried out on the inputs to generate components of smaller size to further reduce the complexity of operations and correspondingly the size of $\mu'$. For example, as illustrated in FIG. 7, operations on 32-bit integers can be reduced to operations on 8-bit integers by decomposing the 32-bit integers into 4 components modulo $2^8$ as shown in equation (37) below:

$$x=2^{24}x_3+2^{16}x_2+2^8x_1+x_0 \tag{37}$$

where $0 \geq x_3,\ x_2,\ x_1,\ x_0 < 2^8$.

Defining shift left as an arithmetic operation as shown in equation (38):

$$x<<k \triangleq 2^k a \tag{38}$$

for $k \geq 0$ allows addition, subtraction and shift left to be defined by similar recurrence relations as shown in equation (39) below:

$$a_i+b_i+C_i=c_i+2^8C_{i+1}$$

$$a_i-b_i-\overline{C}_i=\overline{c}_i-2^8\overline{C}_{i+1}$$

$$(a_i<<1)+\ddot{C}_i=\ddot{c}_i+2^8\ddot{C}_{i+1} \tag{39}$$

where $C_i,\ \overline{C}_i,\ \ddot{C}_i$ are carries between units and have value zero or one such that the relationships shown in equation (40) hold exactly.

$$a+b+C_0=2^{32}C_4+c$$

$$a-b-\overline{C}_0=-2^{32}\overline{C}_4+c$$

$$(a<<1)+\ddot{C}_0=2^{32}\ddot{C}_4+\ddot{c} \tag{40}$$

The width of the carries can be extended to 8 bits from the 1 bit case shown above in a corresponding manner if desired.

The recursion for addition, subtraction and shift left described above is in each case as shown in equation (41):

$$\langle c_i,C_{i+1}\rangle=f_{i\circ}(a_i,b_i,C_i) \tag{41}$$

for some function $f_{i\circ}$ that depends on i=0, 1, 2, 3 and the operation $\circ$=+, − or <<1 and corresponds to the operation of each of the boxes of FIG. 7. For example, for $\circ$=+ the recursion is as shown in equation (42):

$$\langle c_i,C_{i+1}\rangle=\langle s \bmod 2^8,\lfloor s/2^8\rfloor\rangle \tag{42}$$

where $s=a_i+b_i+C_i$.

Equality and inequality can also be computed using the same arrangement of 8 bit units according to equations (43) and (44) below.

$$\overset{=}{c}_i=\overset{=}{C}_{i+1}=\begin{cases}0 & \overset{=}{C}_i=0 \lor a_i \neq b_i \\ 1 & \overset{=}{C}_i \neq 0 \land a_i=b_i\end{cases} \tag{43}$$

where $\overline{C}_4 \neq 0 \Leftrightarrow c \neq 0 \Leftrightarrow a=b \land \overline{C}_0 \neq 0$ such that the last carry is non-zero exactly when the operands are equal.

$$\overset{\neq}{c}_i=\overset{\neq}{C}_{i+1}=\begin{cases}1 & \overset{\neq}{C}_i=0 \lor a_i \neq b_i \\ 0 & \overset{\neq}{C}_i \neq 0 \land a_i=b_i\end{cases} \tag{44}$$

where $\overset{\neq}{c}_{4,4} \neq 0 \Leftrightarrow c \neq 0 \Leftrightarrow a \neq b \lor \overset{\neq}{c}_{0,0} \neq 0$ such that the last carry is non-zero exactly when the operands differ.

Figure 8:
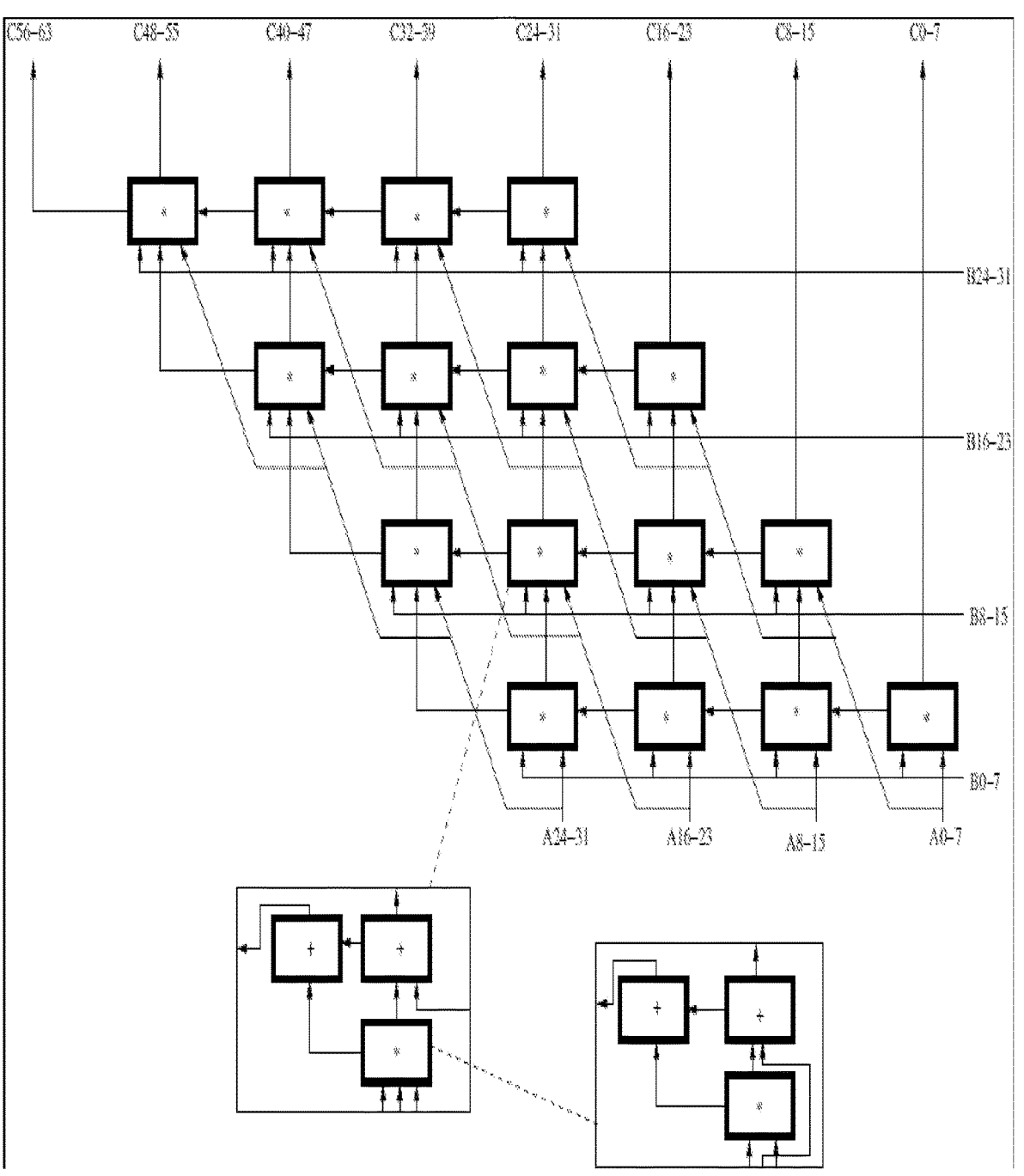

32 bit multiplication can be carried out by an array of 8 bit multiplicative units arranged as shown in FIG. 8. Each of the 8 bit units perform the operation shown in equation (45):

$$c+2^8d=ab+x+y \tag{45}$$

where $0 \leq a,\ b,\ c,\ d,\ x,\ y < 2^8$, such that outputs c, d are produced from inputs a, b, x, y.

Each multiplicative unit can be decomposed into smaller units, as illustrated in FIG. 8, that are arranged to perform the operations shown in equation (46) to further reduce the size of $\mu'$.

$$z+2^8w=x+y$$

$$c+2^8e=ab+z$$

$$d+2^80=w+e \tag{46}$$

Figure 9:
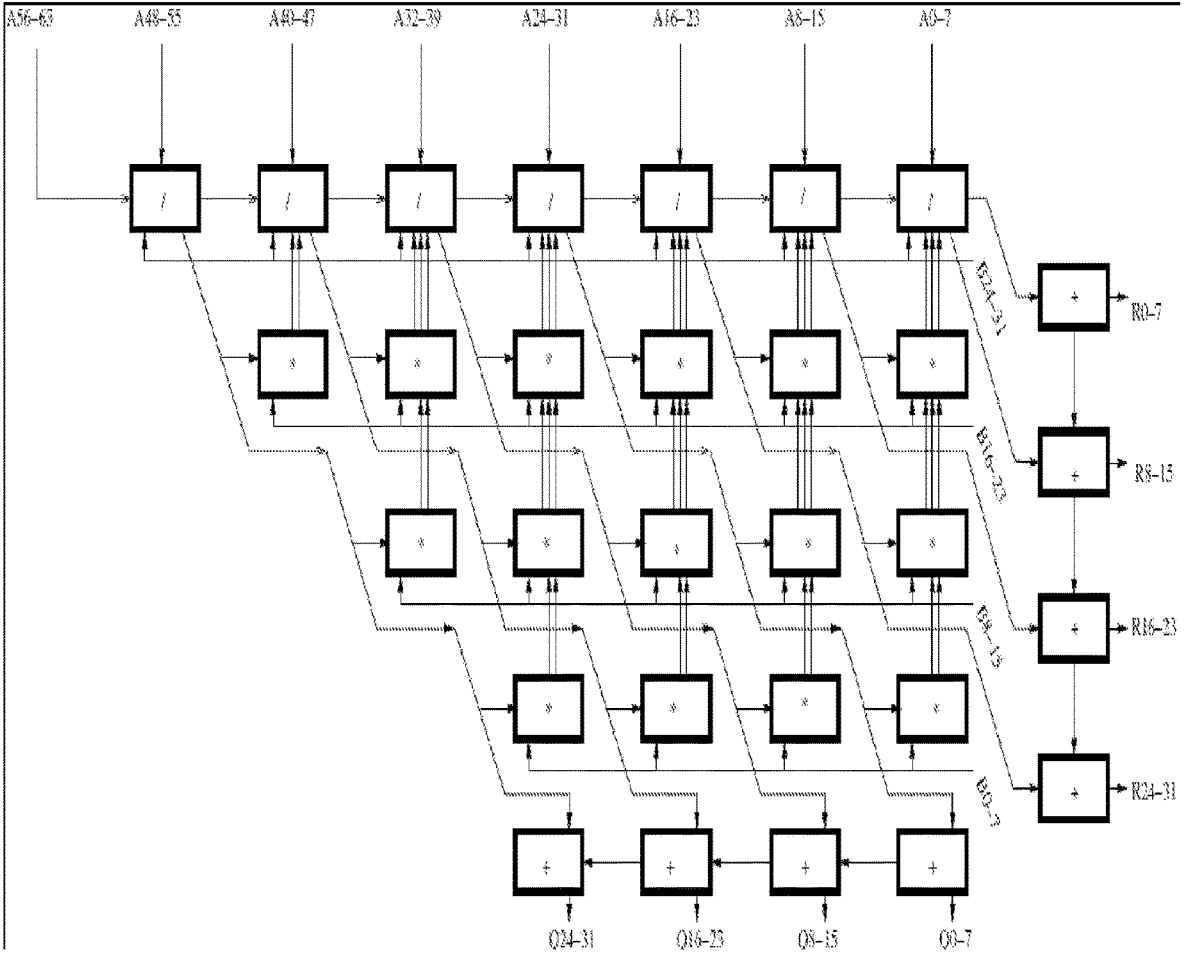

Division can similarly be carried out using an array of smaller units using a decomposition based upon the Fourier transformation, as illustrated in FIG. 9.

Alternatively a single ALU decomposition may be used and a programmer or compiler can organise program code such that it does not rely on more than a few bits of output or input from the ALU decomposition at each arithmetic instruction, and the desired full 32-bit result is obtained via a sequence of instructions that implements a combination of 16-bit operations, or mixtures of 16-bit and 32-bit operations.

For example, full 32-bit addition can be obtained from four 16-bit ALUs, or one 16-bit ALU and a sequence of 16-bit ALU operations. The relations between two unencrypted 32-bit operands a and b and 32-bit sum c with 32-bit carry z is shown in (47).

$$a+b=2^{32}z+c \tag{47}$$

If the top 16 bits of a are denoted as $a_1$, the bottom 16 bits of a are denoted as $a_0$, and similarly for b, c, and z, then the values c, z of equation (47) are mathematically constructed from a, b as shown in (48):

$$c=2^{16}c_1+c_0$$

$$z=z_2 \tag{48}$$

where:

$$2^{16}a_1+a_0=a;$$

$$2^{16}b_1+b_0=b;$$

$$\langle c_0,z_1\rangle = \langle a_0+b_0 \bmod 2^{16}, \lfloor (a_0+b_0)/2^{16}\rfloor\rangle; \text{ and}$$

$$\langle c_1,z_2\rangle = \langle a_1+b_1+z_1 \bmod 2^{16}, \lfloor (a_1+b_1+z_1)/2^{16}\rfloor\rangle$$

If the number of bits in the encryption is reduced to 16 then the encryption c' of c in equation (48) is composed of the 16 bits $c_1'$ and the 16 bits $c_0'$, respectively the top and bottom bits. The encryption z' of z in equation (48) is composed similarly. The construction of (47) can then be reproduced using an encrypted 16-bit ALU with functionality ALU16' as shown in (49):

$$c'=c_1'c_0$$

$$z'=0'z_2' \tag{49}$$

where:

$$a_1'a_0'=a';$$

$$b_1'b_0'=b';$$

$$\langle c_0',z_1'\rangle = \langle a_0',b_0'\rangle \text{ ALU16}'_{add}';$$

$$\langle c_{1a}',z_{2a}'\rangle = \langle a_1',b_1'\rangle \text{ ALU16}'_{add}';$$

$$\langle c_1',z_{2b}'\rangle = \langle c_{1a}',z_1'\rangle \text{ ALU16}'_{add}'; \text{ and}$$

$$\langle 0',z_2'\rangle = \langle z_{2a}',z_{2a}'\rangle \text{ ALU16}'_{add}'.$$

Figure 10:
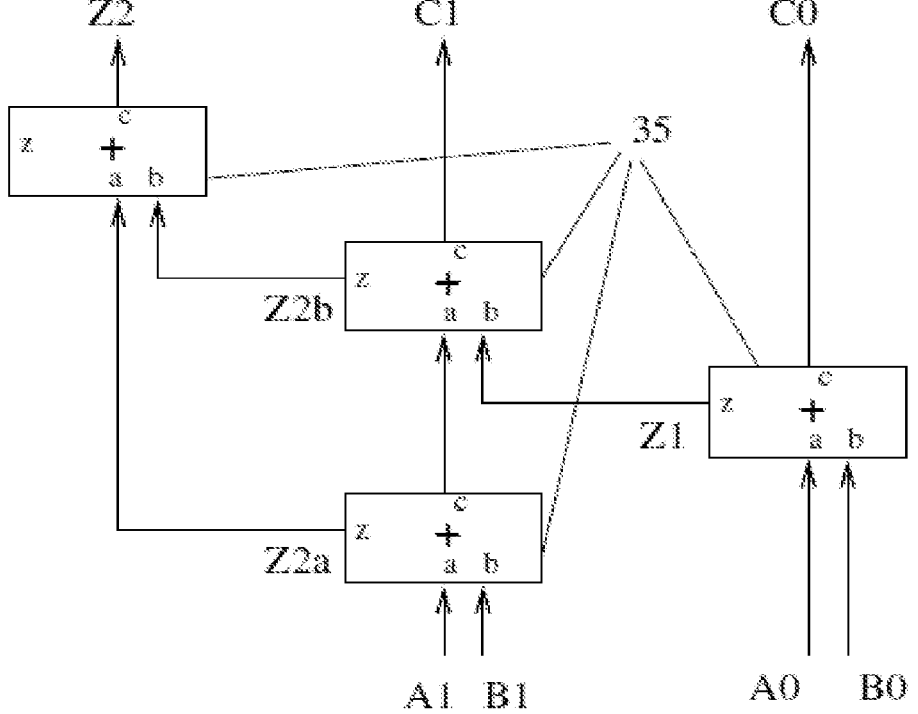
FIG. 10 is a schematic illustration of reduction of integer arithmetic operations on 16-bit integers.

The scheme is illustrated in FIG. 10, which shows use of four encrypted 16-bit ALUs 35, each performing encrypted addition to simultaneously construct the 32-bit encrypted outputs from the 32-bit encrypted inputs. Similar reductions can be effected for other operations.

It will be understood from the above that all of the standard operations of a MIPS processor on 32 bit numbers can be carried out by decomposing the 32-bit numbers into smaller numbers of bits, and in this way the size of the transition matrix $\mu'$ can be reduced to a practical size for modern computing power.

Various modifications to the invention can be provided to protect against attempts to determine the encryption.

For example, it is described above that it may be desirable for Branch components and Jump components to be unencrypted given that the functionality of these components is well known and common to most processors and can therefore provide vulnerability of the processor 7 to attack.

Similarly, where well known elementary functions are provided by a transition function $\mu$ it may be possible to identify those well known elementary functions based upon known properties of the elementary functions. As such, it may be desirable to replace well known elementary functions with functional equivalents that cannot readily be identified. By way of example, replacing addition by faux-addition $\llbracket + \rrbracket$ in which an additional value is added by the operation as shown in equation (50) prevents a person identifying a standard addition function.

$$a \llbracket + \rrbracket b \triangleq a+b+1 \tag{50}$$

Adding two numbers a, b using the above function, then simply requires two additions to be carried out, a first in which the result is a+b+1 and a further addition in which −2 is added to a+b+1 using the same function to arrive at the correct value a+b.

The functionality of a shift operation can be modified in the encrypted ALU by encoding non-standard results for shift operations of 32 or more such that the algebra of the operation differs from the algebra of standard shift operations. In practice, shift operations of greater than 32 are not used in practice in a 32-bit machine and as such, providing non-standard results for operations shift operations greater than 32 does not negatively affect operation of the ALU whilst protecting against possible determination of the shift operation by examination of results of shift by greater than 32.

In a similar manner, operations can be modified in the encrypted ALU to generate outputs that include redundant data in order to protect against possible attempts to decode the encryption, for example by adding random data to 32-bit values where only some of the 32-bits are required for the value. For example, an addition operation may provide an output carry flag to indicate a value that is too large to be represented by 32-bits, with the output carry flag generally taking a value "0" to indicate no carry or "1" to indicate carry. In some embodiments a single bit of a multiple bit value may be used to indicate carry or no carry, and other bits may be provided with random values. Alternatively, a random value may be used to indicate a standard "0" or "1" carry value to protect against determination of the values "0" or "1".

It may be possible in some embodiments to determine a value "0". For example, by examining the output of encrypted addition of encrypted values if values x, y where x+y=x are determined, it can be deduced that the encrypted value y represents a value zero. As such, performing operations and determining where the output is equal to one of the inputs can provide an indication of the value "0". In order to protect against an attack of this sort, integer values can be provided with more than one encrypted value. The ALU can then be designed such that the output of a vulnerable operation provides the alternative encrypted value. For example, the ALU may be designed such that the result of "x+y" where y is equal to "0" is x' where x' is equivalent to x but has an alternative encrypted representation.

The ALU may additionally or alternatively be designed such that a random result is returned for certain prohibited operations that may be used to determine the encryption. For example, a random value may be returned for any operation x/x or x−x which could otherwise be used to determine the encryption of values of 1 and 0 respectively.

The use of two or more encrypted values for a particular value described above may be used to enable operations to be carried out in which the risk of a prohibited operation being carried out is avoided. In particular, each value may be encrypted so as to include a type bit embedded in the encryption. In this way a value has a first encryption in which the type bit has value "0" indicating the encrypted value is of type "A" and a second encryption in which the type bit has value "1" indicating that the encrypted value is of type "B".

The ALU may be designed such that operations can only be carried out upon pairs of values of differing types, and to return a value of either type A or type B dependent upon the order of the inputs in the operation. For example, where x is of type A and y is of type B, an operation x+y may return a value c=x+y having type A and an operation y+x may return a value c'=x+y having type B, wherein the encryption of c and c' are different but when decrypted provide the same value. Operations using the values c and c' will provide a result that differs only in type.

Where an operation is carried out upon a pair of values that are not of the correct type, for example values x and y both of type A, the ALU may return a random value or a predetermined value indicating that such an operation has been attempted.

Use of addition with zero or multiplication by 1 can be used to change the type of a value in a calculation where necessary. For example given an encryption of a value x of type A, the encryption of x of type B can be obtained in the system described above by performing b+x where b is the encryption of 1 of type B.

In this way, careful programming and/or compiling of a program can ensure that operations are carried out upon values of the correct types such that it is not necessary to guarantee that a program does not perform a prohibited operation involving identical values such as x–x and x/x. That is, where an operation x/x that may in general be prohibited will in fact be carried out on values x and x' having different types such that the operation is successfully performed without affecting the functioning of the program, and providing the correct encrypted value corresponding to "1" and indicating the appropriate type. However where an attempt to determine the encryption is made by inputting an operation x/x the operation will fail because the values x are identical and therefore have the same type.

It can be noted that there exist operations that may be useful in determining encryptions of values that do not involve the same value as both operands. For example, the encrypted operation (x+y)/(y+x) can be used to determine the encryption of 1 (assuming that x+y≠0). However it is noted that the encrypted operations will not in general be known, and in particular it is not generally possible to distinguish the encrypted addition operator from the encrypted subtraction operation or the encrypted multiplication operation from the encrypted division operation and as such the result that is provided cannot be interpreted. For example, even if the encrypted operation "/" is known, the encrypted value provided by (x ? y)/(y ? x) could be an (since there are two, one for each type) encryption of 1 where the operator ? is addition, and an encryption of –1 where the operation is subtraction.

In any case, using three encryption types A, B, C distinguished by a pair of type bits can be used to overcome the above problem since it is not possible to swap different type ALU inputs for a commutative operation and obtain two different typed results as output.

The encryption may additionally or alternatively be designed to include check bits in encrypted numbers that allow the ALU to determine whether an input value is a valid encrypted value. Such check bits protect against an attempt to determine the encryption whereby an operation such as subtraction is determined, or guessed, and used to determine other values. For example, the value x–x will always be equal to zero and as such if the subtraction operation is known or guessed it is possible to determine a value "0" by performing subtraction on arbitrary values of x. However where check bits are used, if the values of x are not valid encryptions the ALU can be designed to return a random non-zero value.

The ALU may be designed such that it is limited to a predetermined number of operations in order to protect against attacks using a very large number of calculations. For example, the ALU may be designed such that a key is required to be refreshed from an external source by way of an encrypted communication after a predetermined number of operations or a predetermined time.

It will be appreciated that whilst the above description indicates that components are implemented in hardware, the components may be implemented in software. For example, the encryption/decryption chips may be software modules which encrypt and decrypt data and the encrypted processor may be implemented in software.

What is claimed is:

1. A processor comprising:
at least one interface; and
an arithmetic logic unit (ALU) to:
    receive encrypted data at the at least one interface;
    perform encrypted data processing on the encrypted data, to produce encrypted output data that is equivalent to second data, wherein the second data would be generated by decrypting the encrypted data to generate decrypted data, performing data processing by another ALU on the decrypted data, and encrypting output data resulting from the performing the data processing on the decrypted data, wherein the ALU comprises registers residing within an encrypted zone of the ALU, the registers containing data for processing and wherein registers residing outside the encrypted zone contain encrypted data for processing; and
  output the encrypted output data at the at least one interface, wherein the encrypted data remains encrypted throughout the processor and the encrypted data processing.

2. The processor of claim 1, wherein the processor does not receive, store nor use a decryption key, throughout the encrypted data processing.

3. The processor of claim 1, wherein the equivalent performing data processing by another ALU comprises one or more of addition, subtraction, multiplication, division, shift left, logical and, logical or, or equivalence.

4. The processor of claim 1, wherein an encrypted instruction included in the encrypted data defines one or more relationships between encrypted data values and the encrypted output data.

5. The processor of claim 1, wherein the arithmetic logic unit comprises:
a combinatorial logic unit that produces certain outputs when provided with certain inputs; and
a matrix of outputs against inputs.

6. The processor of claim 1, wherein:
the arithmetic logic unit comprises a plurality of registers; and
the encrypted data processing comprises changing state of the plurality of registers by generating output based upon particular inputs in a predetermined way in accordance with an instruction and sub-matrix of a matrix.

7. The processor of claim 1, wherein:

the data processing by another ALU comprises at least one of addition, subtraction, multiplication or division; and the ALU that is to perform the encrypted data processing comprises four encrypted ALUs each operating in accordance with a transition matrix.

8. A method, comprising:

receiving encrypted data into an arithmetic logic unit (ALU);

performing, by the ALU, encrypted data processing on the encrypted data, to produce encrypted output data that is equivalent second data, wherein the second data would be generated by decrypting the encrypted data to generate decrypted data, performing data processing by another ALU on the decrypted data, and encrypting output data resulting from the performing the data processing on the decrypted data, wherein the ALU comprises registers residing within an encrypted zone of the ALU, the registers containing data for processing and wherein registers residing outside the encrypted zone contain encrypted data for processing; and outputting the encrypted output data from the ALU, wherein the encrypted data remains encrypted throughout the ALU and the encrypted data processing.

9. The method of claim 8, wherein the ALU does not receive, store nor use a decryption key, throughout the encrypted data processing.

10. The method of claim 8, wherein the equivalent performing data processing by another ALU comprises one or more of addition, subtraction, multiplication, division, shift left, logical and, logical or, or equivalence.

11. The method of claim 8, wherein an encrypted instruction included in the encrypted data defines one or more relationships between encrypted data values and the encrypted output data.

12. The method of claim 8, wherein the performing encrypted data processing comprises:

producing certain outputs from a combinatorial logic unit that receives certain inputs and inputs the certain inputs to a matrix of outputs against inputs.

13. The method of claim 8, wherein the performing encrypted data processing comprises:

changing state of a plurality of registers by generating output based upon particular inputs in a predetermined way in accordance with an instruction and sub-matrix of a matrix.

14. The method of claim 8, wherein:

the data processing by another ALU comprises at least one of addition, subtraction, multiplication or division; and the encrypted data processing comprises performing data processing through four encrypted ALUs each operating in accordance with a transition matrix.

15. A tangible, non-transitory, computer-readable media having instructions thereupon which, when executed by a processor, cause the processor to perform a method comprising:

receiving encrypted data into an arithmetic logic unit (ALU);

performing, by the ALU, encrypted data processing on the encrypted data, to produce encrypted output data that is equivalent to second data, wherein the second data would be generated by decrypting the encrypted data to generate decrypted data, performing data processing by another ALU on the decrypted data, and encrypting output data resulting from the performing the data processing on the decrypted data, wherein the ALU comprises registers residing within an encrypted zone of the ALU, the registers containing data for processing and wherein registers residing outside the encrypted zone contain encrypted data for processing; and outputting the encrypted output data from the ALU, wherein the encrypted data remains encrypted throughout the ALU and the encrypted data processing and wherein the ALU does not receive, store nor use a decryption key, throughout the encrypted data processing.

16. The computer-readable media of claim 15, wherein the equivalent performing data processing by another ALU comprises one or more of addition, subtraction, multiplication, division, shift left, logical and, logical or, or equivalence.

17. The computer-readable media of claim 15, wherein an encrypted instruction included in the encrypted data defines one or more relationships between encrypted data values and the encrypted output data.

18. The computer-readable media of claim 15, wherein the performing encrypted data processing comprises:

producing certain outputs from a combinatorial logic unit that receives certain inputs and inputs the certain inputs to a matrix of outputs against inputs.

19. The computer-readable media of claim 15, wherein the performing encrypted data processing comprises:

changing state of a plurality of registers by generating output based upon particular inputs in a predetermined way in accordance with an instruction and sub-matrix of a matrix.

20. The computer-readable media of claim 15, wherein:

the data processing by another ALU comprises at least one of addition, subtraction, multiplication or division; and the encrypted data processing comprises performing data processing through four encrypted ALUs each operating in accordance with a transition matrix.

\* \* \* \* \*